US008783629B2

(12) United States Patent
Even et al.

(10) Patent No.: US 8,783,629 B2
(45) Date of Patent: Jul. 22, 2014

(54) ATTACHMENT SYSTEM FOR LINES, IN PARTICULAR FOR CABLES FOR WIND TURBINES (75) Inventors: Rainer Even, Saarbrücken (DE); Burhan Yagci, Sulzbach (DE)

(73) Assignee: Hydac Accessories GmbH, Sulzbach/Saar (DE)

( * ) Notice: Subject to any disclaimer, the term of this patent is extended or adjusted under 35 U.S.C. 154(b) by 491 days.

(21) Appl. No.: 12/805,681

(22) Filed: Aug. 12, 2010

(65) Prior Publication Data
US 2012/0028511 A1    Feb. 2, 2012

(30) Foreign Application Priority Data

Jul. 29, 2010 (DE) .......................... 10 2010 032 686
Jul. 29, 2010 (DE) .......................... 10 2010 032 687

(51) Int. Cl.
*F16L 3/22* (2006.01)
(52) U.S. Cl.
USPC .............................. 248/68.1; 248/581; 248/49
(58) Field of Classification Search
USPC .......... 248/591, 49, 50, 51, 56, 65, 68.1, 74.5
See application file for complete search history.

(56) References Cited

U.S. PATENT DOCUMENTS

| 1,722,075 | A | * | 7/1929 | Coon | 294/174 |
| 1,919,319 | A | * | 7/1933 | Church | 285/217 |
| 2,497,820 | A | * | 2/1950 | Kielland | 403/390 |
| 2,745,199 | A | * | 5/1956 | Kreinberg | 40/518 |
| 3,054,587 | A |   | 9/1962 | Hebenstreit et al. | |
| 3,188,030 | A | * | 6/1965 | Fischer | 248/68.1 |
| 3,695,563 | A | * | 10/1972 | Evans | 248/56 |
| 4,198,812 | A | * | 4/1980 | Hennig et al. | 59/78.1 |
| 4,249,353 | A | * | 2/1981 | Berry | 52/232 |
| 4,347,998 | A |   | 9/1982 | Loree | |
| 4,431,152 | A | * | 2/1984 | Reed, Jr. | 248/65 |
| 4,550,690 | A | * | 11/1985 | Baugher | 122/510 |
| 4,702,444 | A | * | 10/1987 | Beele | 248/56 |
| 4,769,985 | A | * | 9/1988 | Moritz | 59/78.1 |
| 4,878,782 | A | * | 11/1989 | Beattie et al. | 405/119 |
| 4,889,298 | A | * | 12/1989 | Hauff | 248/56 |
| 4,901,956 | A | * | 2/1990 | Jacobsen | 248/56 |
| 5,033,701 | A | * | 7/1991 | Kraus | 248/68.1 |
| 5,060,810 | A | * | 10/1991 | Jones | 211/59.4 |
| 5,257,768 | A |   | 11/1993 | Juenemann et al. | |

(Continued)

FOREIGN PATENT DOCUMENTS

DE           23 41 618        3/1975
DE    20 2006 006 347 U1      6/2006

(Continued)

*Primary Examiner* — Bradley Duckworth
(74) *Attorney, Agent, or Firm* — Roylance, Abrams, Berdo & Goodman LLP (57) ABSTRACT

An attachment system for lines, in particular for cables for wind turbines, has a base body (1) secured to a support structure and forming at least one line bushing having an opening closed by a cover part (7) screwed to the base body (1) for insertion of lines. At least one receiving element in the pertinent line bushing forms a receiving space (23) matched to the line or lines to be secured. The cover part (7) has contact surfaces (29) for the pertinent lines located in the respective receiving spaces (23). A spring arrangement (25) produces pretensioning active between the receiving element (9) and contact surface (29) of the cover part (7).

13 Claims, 9 Drawing Sheets (56) References Cited

U.S. PATENT DOCUMENTS

| | | | | |
|---|---|---|---|---|
| 5,778,656 | A | * | 7/1998 | Hart ............................... 59/78.1 |
| 6,053,456 | A | * | 4/2000 | Dispenza ......................... 248/56 |
| 6,241,198 | B1 | * | 6/2001 | Maruyama ...................... 248/49 |
| 6,367,238 | B1 | * | 4/2002 | Fischer ........................... 59/78.1 |
| 6,561,466 | B1 | * | 5/2003 | Myers et al. .................. 248/74.4 |
| 6,902,138 | B2 | * | 6/2005 | Vantouroux .................. 248/68.1 |
| 7,614,589 | B2 | * | 11/2009 | Kato ............................... 248/55 |
| 2004/0217236 | A1 | * | 11/2004 | Shibuya ....................... 248/68.1 |
| 2007/0246614 | A1 | * | 10/2007 | Allmann et al. ................ 248/65 |
| 2009/0200434 | A1 | * | 8/2009 | Noyes et al. .................... 248/58 |
| 2009/0218451 | A1 | * | 9/2009 | Lundborg ....................... 248/56 |
| 2011/0080078 | A1 | * | 4/2011 | Perschon et al. ........... 312/293.1 |
| 2012/0205498 | A1 | * | 8/2012 | Komiya .......................... 248/49 |

FOREIGN PATENT DOCUMENTS

| | | |
|---|---|---|
| EP | 0 681 133 A2 | 11/1995 |
| EP | 1 059 477 A2 | 12/2000 |
| FR | 2 717 246 A1 | 9/1995 |

\* cited by examiner

ATTACHMENT SYSTEM FOR LINES, IN PARTICULAR FOR CABLES FOR WIND TURBINES

FIELD OF THE INVENTION

The invention relates to an attachment system for lines, in particular for cables for wind turbines. The system has a base body securable to a support structure and forming at least one line bushing. The line bushing has an opening closed by a cover part which can be screwed to the base body for the insertion of lines.

BACKGROUND OF THE INVENTION

To deliver the energy produced in wind turbines and for other operating purposes such as control, monitoring, and the like, lines are necessary which must be attached to the tower segments. They are primarily cables, different systems being possible depending on whether it is a direct current or alternating current system. In alternating current systems, the cables are often attached in bunches of three (according to the RST phases). In direct current systems, individual cables are laid. Laying takes place generally in several attachment tiers. The outside diameter tolerances of the cables lead to problems when the cables are being laid. The parallel routing of bunched cables can lead to strain in the attachment system. For attachment on top of one another can lead to a skewed state of the system parts. To counteract this problem in the prior art equalizing rings are used. This solution is disadvantageous in various regards, especially because installation is complicated and time consuming.

SUMMARY OF THE INVENTION

An object of the invention is to provide an attachment system which is characterized by special ease of installation.

According to the invention, this object is basically achieved by an attachment system having, within the pertinent line bushing of the base body, a receiving element forming a receiving space matched to the respective line or lines to be secured. For laying cables in the base body, receiving elements can then be used whose receiving space is matched to the cable requirement by the receiving space being shaped, for example, for accommodating an individual cable, a group of two, a group of three, or a filler plug. In conjunction with spring-supported clamping of the lines resulting from the pretensioning between the receiving element and the contact surface of the cover part, flush, strain-free contact of the cover part with the base body is ensured for various bunched lines or cables and irrespective of possible diameter tolerances.

Another advantage is that similar base bodies can be used for attachment of various cables or bunched cables. By inserting receiving elements adapted to the requirements into the base body, the attachment system can be prefabricated on a customized basis.

Especially advantageously, the respective receiving element can be supported to be able to move in the base body and be pretensioned by the spring force for movement against the cover part.

Preferably, the base body along one longitudinal axis has more than one line bushing. The receiving elements have a support plate extending along the longitudinal axis and having an edge facing the cover part bordering the receiving space. The edge in the support plate can then form a depression whose shaping and depth are matched to the cables or bunches to be accommodated.

In especially advantageous exemplary embodiments, the base body has a bottom part extending underneath the line bushings, between the bottom part and the receiving elements, with one compression spring at a time being clamped. The spring pretensions the receiving elements against the cover part.

With respect to the arrangement of the receiving elements in the base body, the receiving elements on both sides of the support plate can have guide strips movably guided in guide grooves extending laterally to the line bushings and perpendicular to the bottom part in the base body.

In the guide grooves, a depression can especially advantageously form a locking edge which in interaction with a catch projection of the pertinent guide strip prevents the receiving element from moving out of the base body. The captive arrangement of the receiving elements in the base body facilitates both prefabrication and also installation.

In one advantageous exemplary embodiment, the base body laterally from the line bushings forms column bodies which extend from the bottom part to the opening of the line bushings and on which guide grooves are made for the guide strips of the receiving elements.

In the column bodies of the base body, through bores in the cover part are assigned for forming the screwed connection.

For an arrangement in a tiered construction, on the bottom part of the base body and on the outer side of the cover part opposite the contact surface, alignment means can be caused to engage one another, so that the pertinent units can be easily arranged flush with one another and on top of one another during installation.

In especially advantageous exemplary embodiments, in addition to or instead of the spring support of the receiving elements from the base part, a spring support can be on the side of the cover part. The contact surfaces with the cover part are formed by moveable pressure bodies pretensioned by spring force in the direction of the receiving space of the assigned receiving element located in the base body. This arrangement advantageously enables compensation of larger tolerances of shape and/or dimensions of the cables or bunched cables to be secured.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 3:
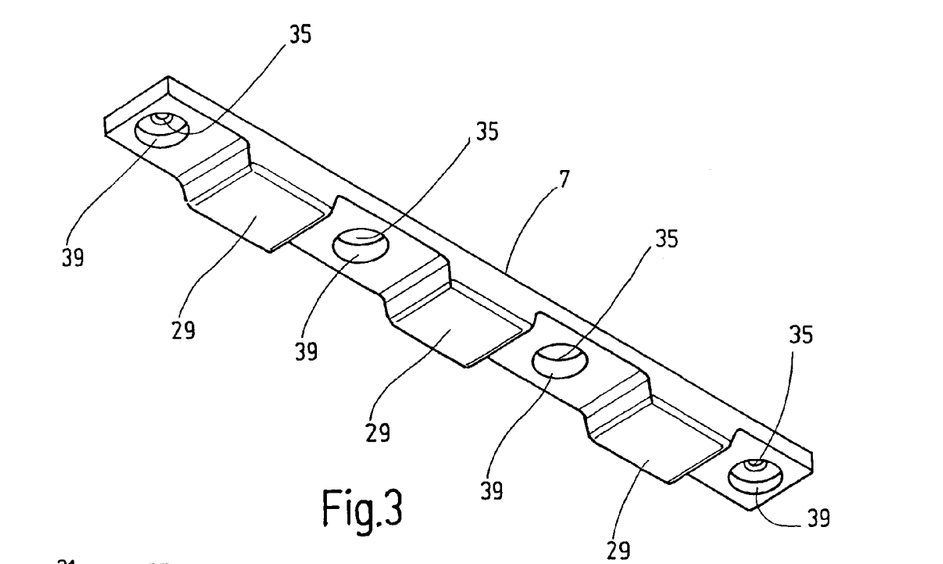
FIG. 3 is a perspective view of only the cover part of the attachment system of FIG. 1.
Figure 4:
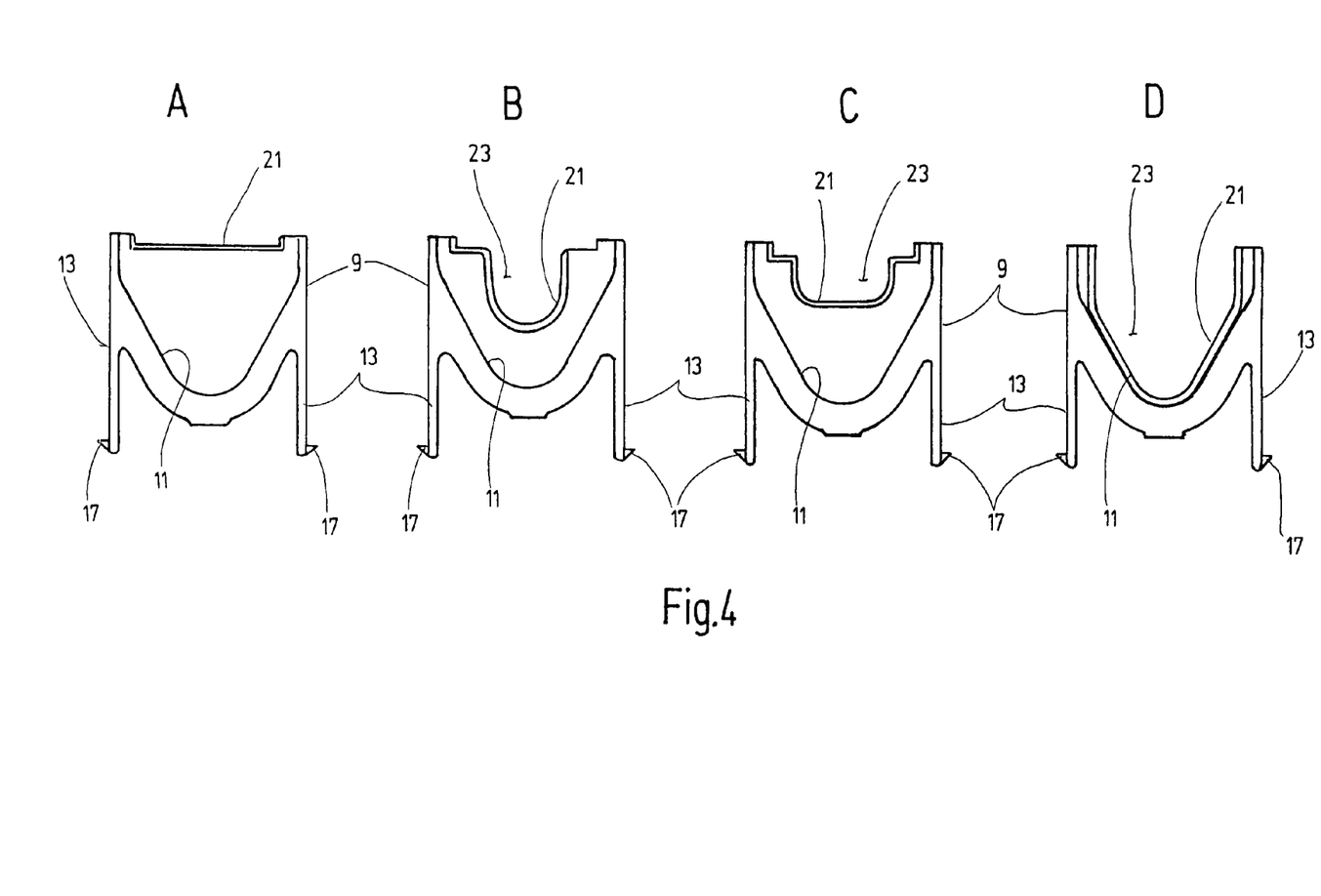
FIGS. 4A to 4D are front elevational views of receiving elements matched to different cable applications for the attachment system of FIG. 1.
Figure 5:
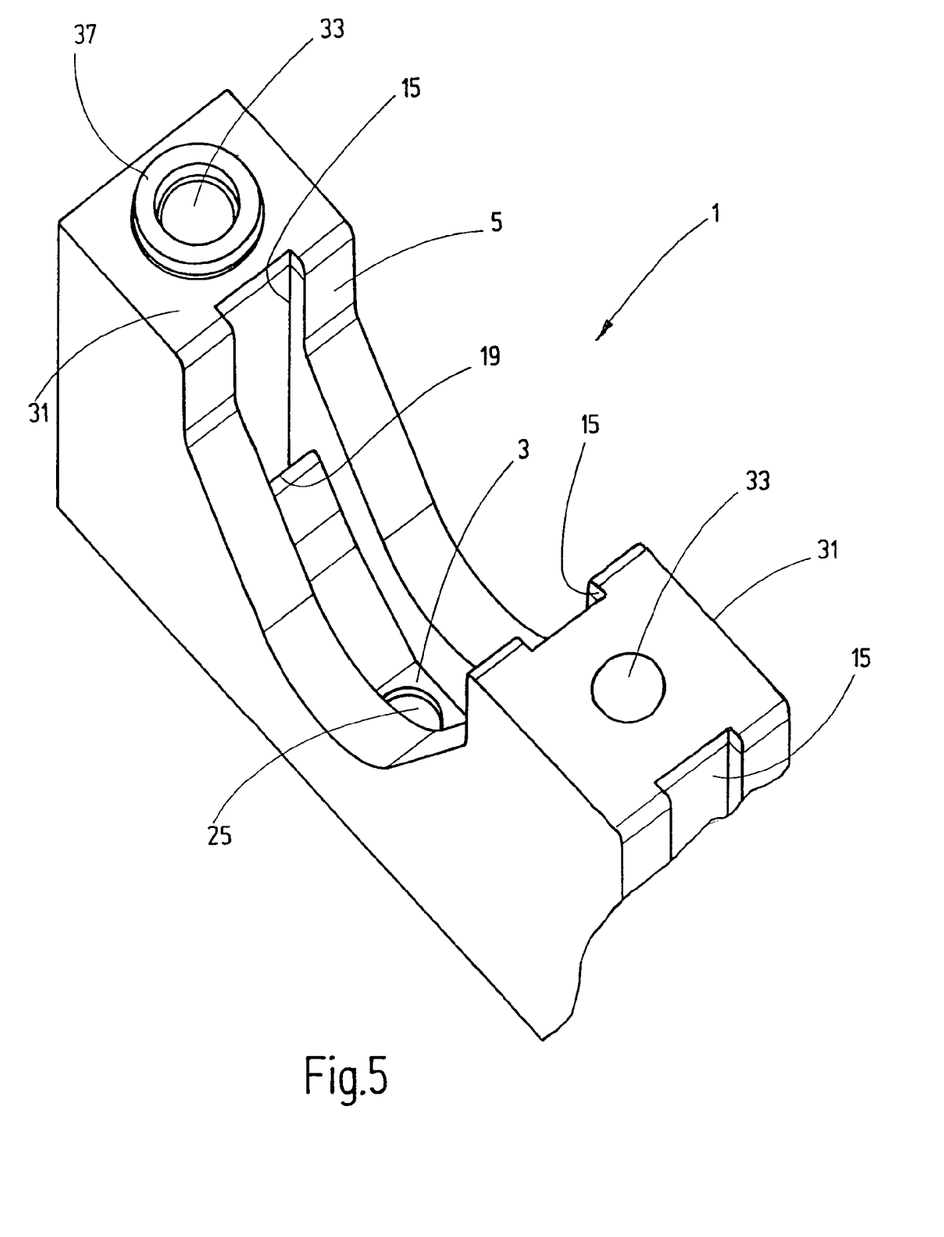
FIG. 5 is an enlarged, cutaway, perspective view of part of the base body of the attachment system of FIG. 1.
Figure 6:
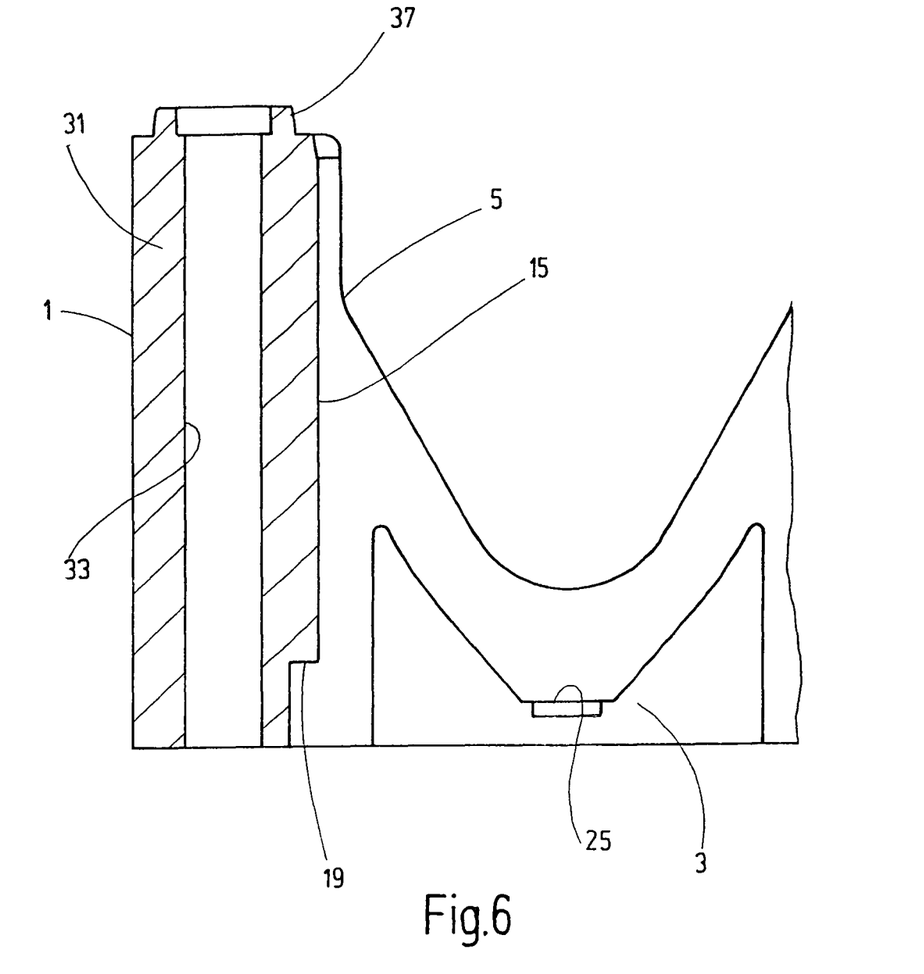
FIG. 6 is a partial front elevational view in section of the base body of FIG. 5.

A first exemplary embodiment of the attachment system is explained below using FIGS. 1 to 7. In the illustrated example, a base body 1, shown separately in FIG. 2, forms a strip-shaped or beam-shaped body. Its underside forms a closed bottom part 3. Line bushings 5 are arranged at regular intervals along the longitudinal axis of the base body 1 and are open towards the top opposite the bottom part 3. In the illustrated exemplary embodiment there are three line bushings 5. FIG. 3 separately shows a cover part 7, as the upper termination of the base body 1. Cover part 7 can be screwed to the base body 1, the screw connection not being shown in the drawings. The line bushings 5, as is best shown by FIGS. 5 and 6, are shaped such that one receiving element 9 at a time can be inserted into the respective line bushing 5. FIGS. 4A to 4D show examples of the receiving elements 9 adapted to the respective requirements, with FIG. 4A showing the shape for a blind plug, FIG. 4B showing the shape for an individual cable of comparatively large cross section, FIG. 4C showing the shape for two individual cables, and FIG. 4D showing the shape for a bunch of three cables. The receiving elements 9, for supporting the respective cables, form support plates 11 extending along the longitudinal axis and connected on both sides to the guide strips 13 which can be pushed into the guide grooves 15. The guide grooves 15, as FIGS. 5 and 6 show, are made in the base body 1 within the line bushings 5. The guide strips 13 on the end side have catch projections 17. After pushing receiving elements 9 into the base body 1, catch projections 17 interaction with locking edges 19 in the guide grooves 15 (see especially FIG. 6) impede removal of the receiving elements 9 from the base body 1, so that the receiving elements 9 are captively held.

Figure 1:
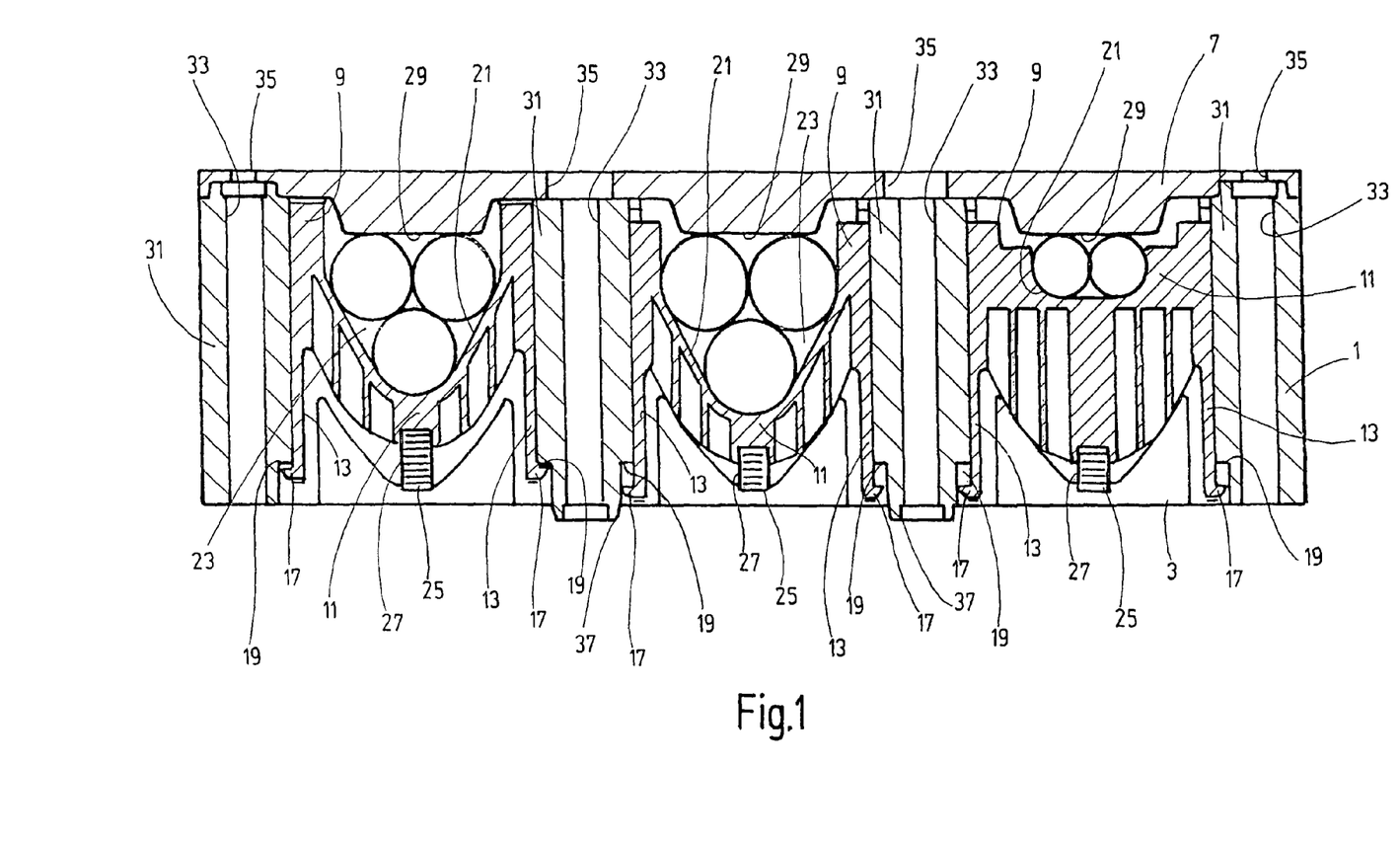
FIG. 1 is a front elevational view in section of an attachment system according to a first exemplary embodiment of the invention.
Figure 2:
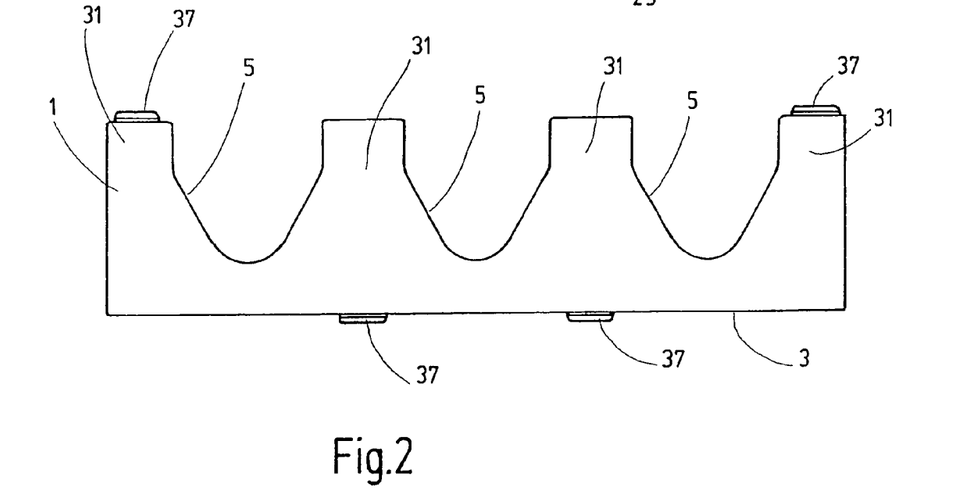
FIG. 2 is a front elevational view of only the base body of the attachment system, drawn on a smaller scale, of FIG. 1.

As FIGS. 4A to 4D clearly show, the upper edge 21 of the support plate 11 of the receiving elements 9 faces the cover part 7 in the state inserted into the base body 1, and forms the boundary of the respective receiving space 23 (FIGS. 4B to 4D), in the support plate 11. A more or less large or deep depression is formed in the example from FIG. 4D and has a roughly V-shaped cross section for holding a bunch of three conductors. In the central region of each line bushing 5, the base body 1 on the bottom part 3 forms a seat 25 (FIGS. 5 and 6) for a compression spring 27 supported on the bottom of the support plate 11 of the pertinent receiving element 9 to pretension it for movement along the guide grooves 15 against the cover part 7. As FIG. 1 shows, in this way the cables located in the receiving space 23 of the receiving elements 9 are tensioned against the contact surface 29 of the cover part 7 screwed to the base body 1.

Figure 7:
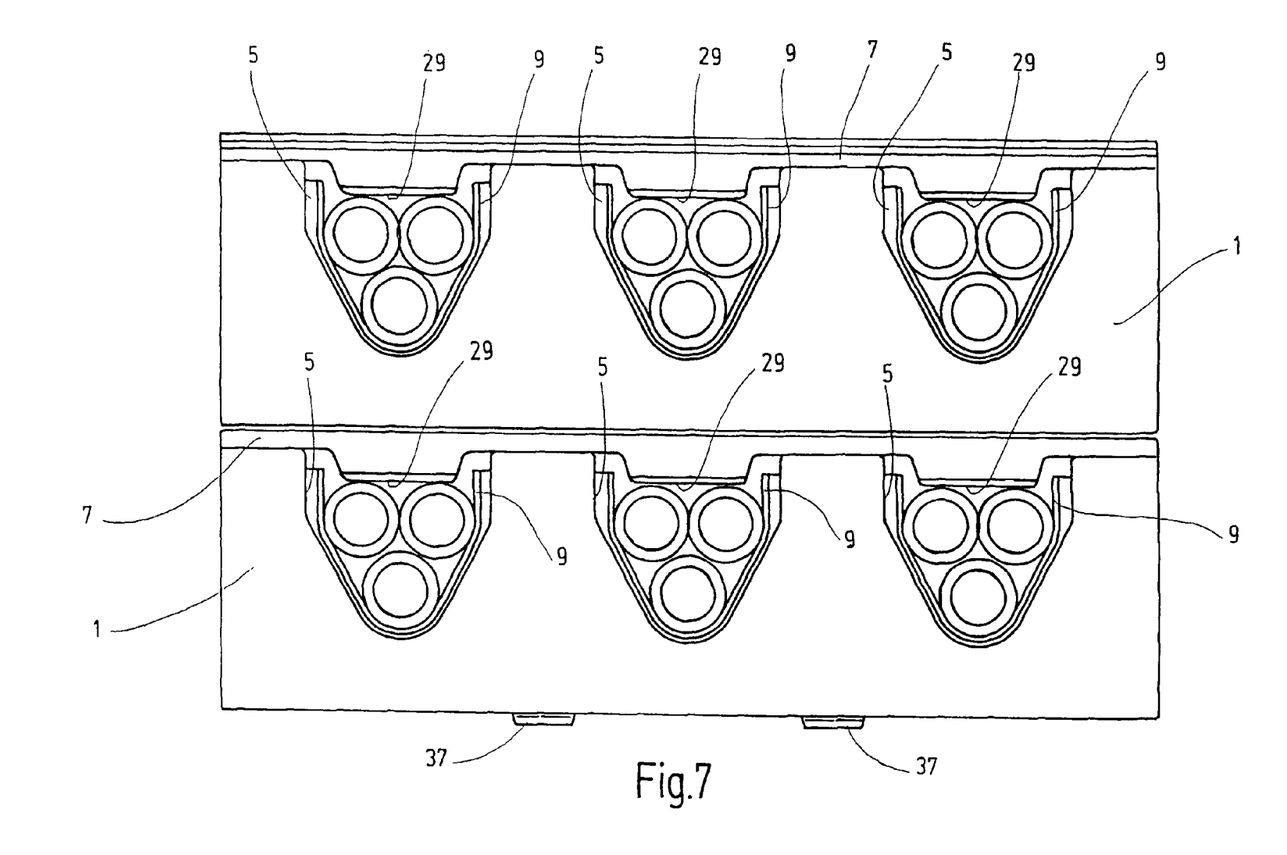
FIG. 7 is a front elevational view of an attachment system of FIG. 1 shown in a tiered construction.

For purposes of the screw connection of the cover part 7 and the base body 1, the base body 1 laterally from the line bushings 5 has column bodies 31. The column sides facing the line bushings 5, form guide grooves 15 and contain through bores 33 to which the corresponding bores 35 are assigned in the cover part 7 to form the screw connection. To ensure exact alignment of the base body 1 and cover parts 7 during installation, especially in a tiered construction, as is shown in FIG. 7, alignment means are provided. In the illustrated example the alignment means are projecting guide projections 37 projecting concentrically relative to the through bores 33 on the base body 1. Receivers are provided on the cover part 7 for the projections 37 and are formed by widenings 39 of the bores 35 of the cover part 7.

Figure 8:
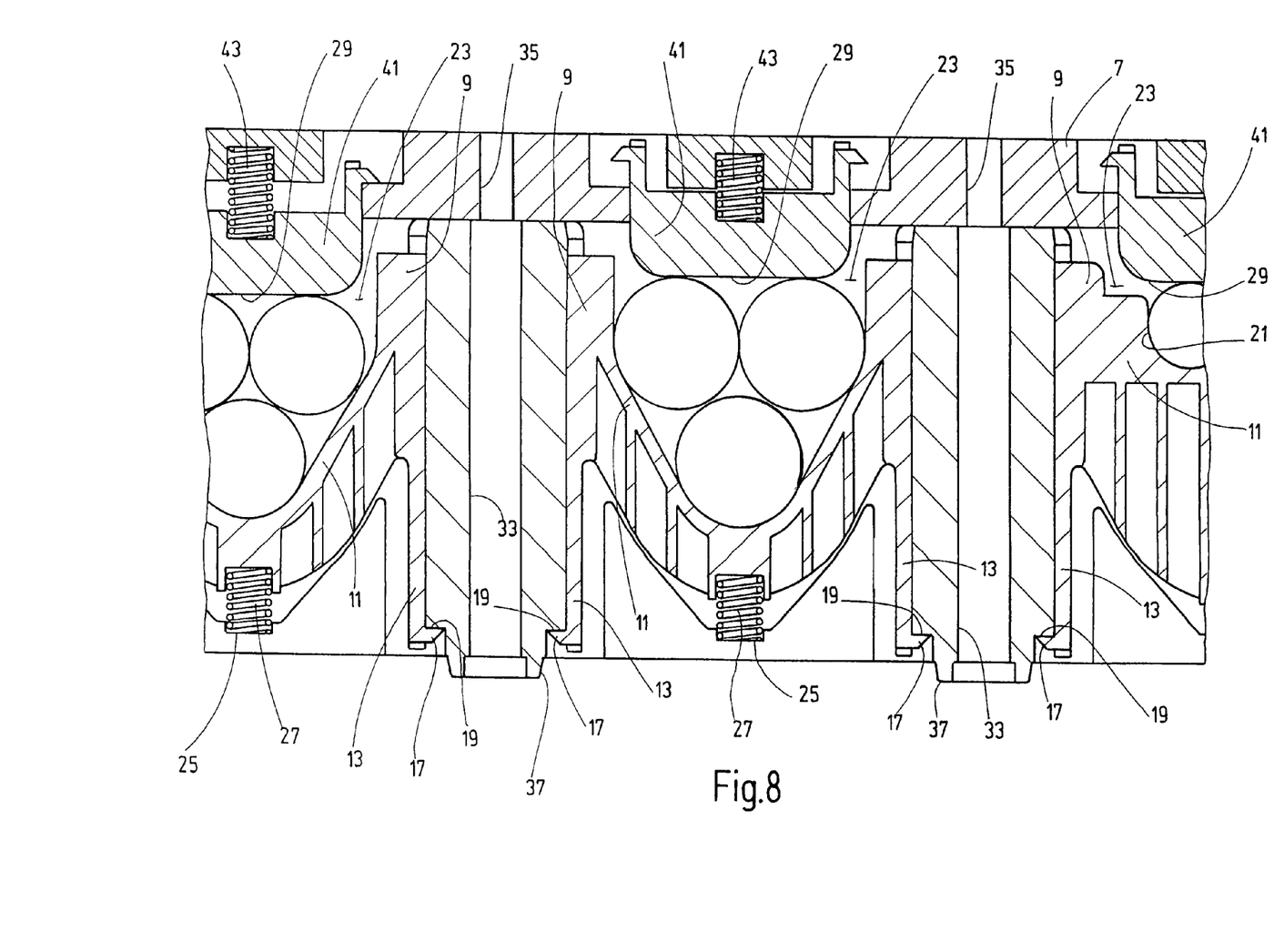
FIG. 8 is a partial front elevational view in section of an attachment system according to a second exemplary embodiment of the invention, shown on a larger scale than in FIG. 1.

The second exemplary embodiment shown in FIG. 8 differs from the first exemplary embodiment only in a different construction of the cover part 7. Unlike in the first exemplary embodiment, the components located in the line bushings 5 are secured not only by spring support of the bottom part 3 of the base body 1, but also by spring support from the cover part 7. For this purpose, on the cover part 7, movable pressure bodies 41 form the contact surfaces 29. The pressure bodies 41 are pretensioned by compression springs 43 for movement against the interior of the receiving spaces 23 of the line bushings 5. Spring support from the cover part 7 could also replace the spring support from the bottom part 3.

Figure 9:
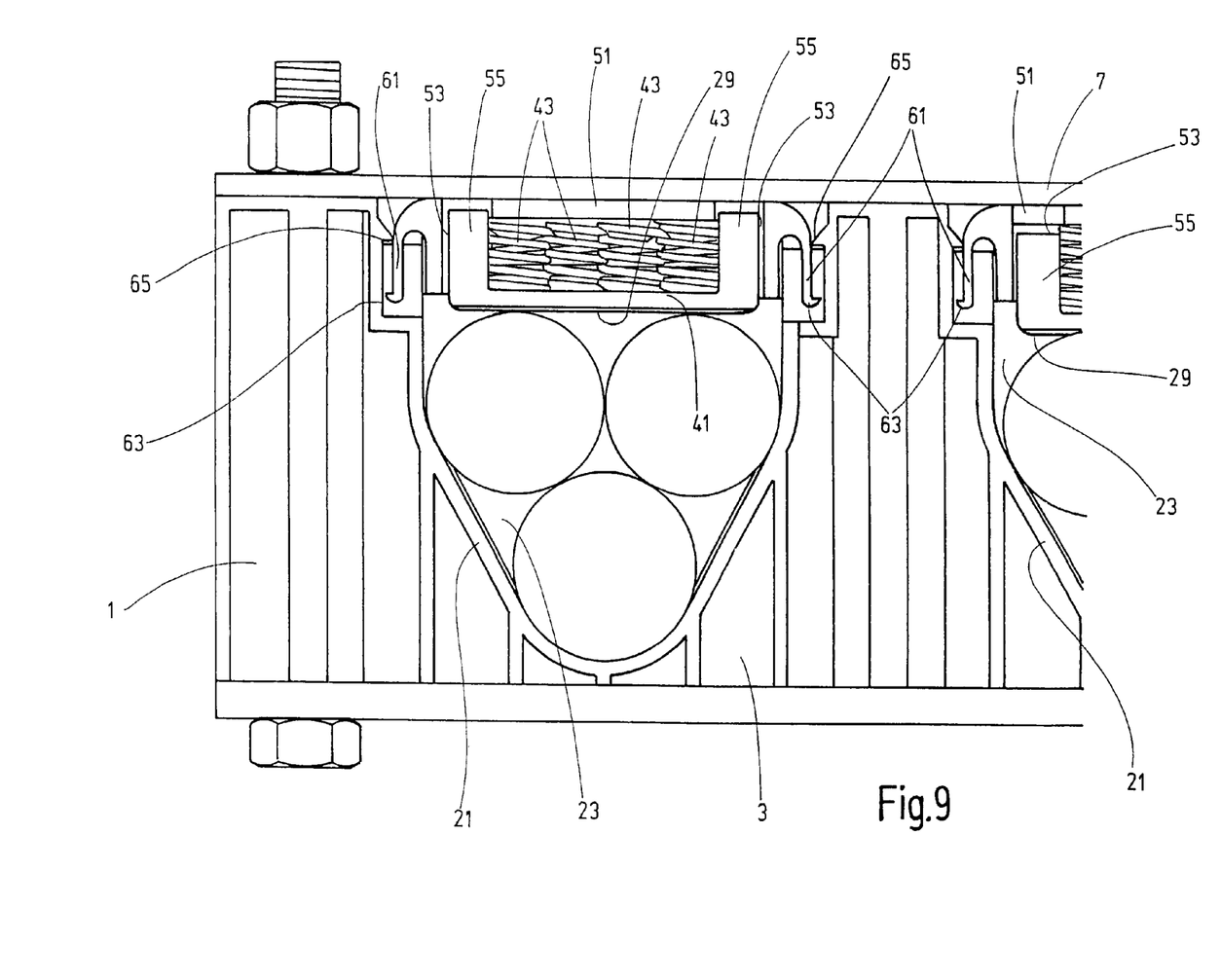
FIG. 9 is a partial front elevational view of an attachment system according to a third exemplary embodiment of the invention, enlarged compared to FIG. 8.
Figure 10:
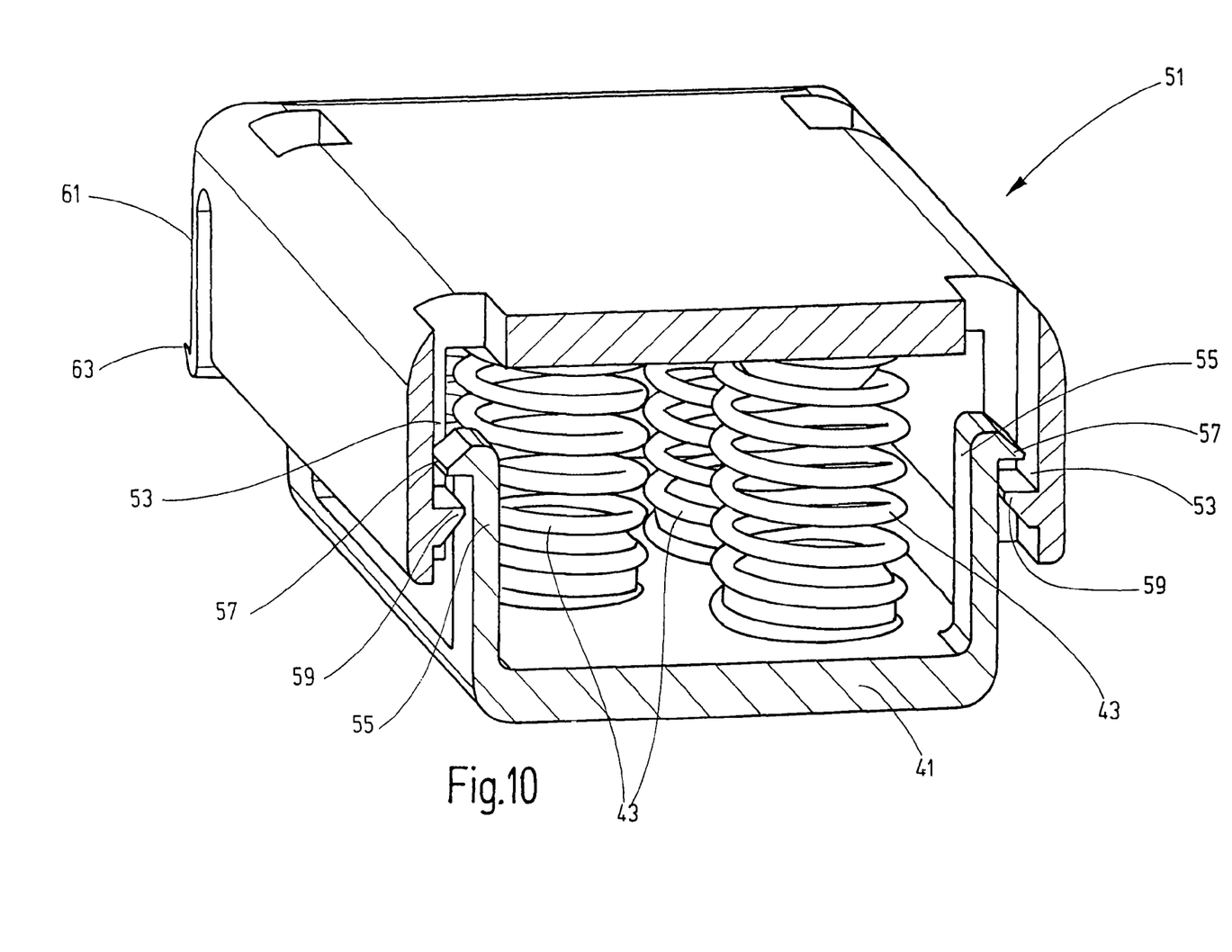
FIG. 10 is a further enlarged, open, perspective view of the spring housing with a spring-loaded pressure body for the attachement system of FIG. 9.

The third exemplary embodiment shown in FIGS. 9 and 10 has no movable receiving elements 9 which are spring-loaded from the bottom part 3 on the base body 1. The base body 1 of this embodiment itself forms the receiving spaces 23 bordered by the edges 21. As a replacement for the lack of spring action from the bottom part 3, in the example of FIGS. 9 and 10 the spring force is active from the top cover part 7 and is intensified by one spring assembly formed from several compression springs 43 located next to one another and located within the spring housing 51 in FIG. 10, instead of an individual spring 43. The spring housing has guideways 53 in which guide strips 55 extend into the spring housing 51 in the corner regions of the pressure body 41 and are guided for a lifting path corresponding to a comparatively long spring path bordered by stop projections 57 and 59 to prevent emergence of the tensioned pressure body 41 from the spring housing 51. As is most clearly shown in FIG. 9, on the corner regions of the spring housing 51 locking strips 61 with catch projections 63 interact with catch projections 65 on the base body 1 captively locking the spring housing 51 on the base body 1 permitting the cables to be inserted into the receiving spaces 23 with the cover part 7 not yet attached and before the cover part is mounted. The cables are temporarily protected against falling out by attachment of the spring housing 51.

While various embodiments have been chosen to illustrate the invention, it will be understood by those skilled in the art that various changes and modifications can be made therein without departing from the scope of the invention as defined in the appended claims.

What is claimed is:

1. An attachment system for lines, comprising:
a base body securable to a support structure and having a bottom part;
a plurality of line bushings in said base body along a longitudinal axis and having openings for receiving lines, said bottom part extending underneath said line bushings;
at least one receiving element in each of said line bushings and forming a receiving space matched to a line or lines to be secured therein, said receiving elements forming support plates extending along said longitudinal axis each said receiving element including guide strips on opposite sides of said support plate thereof and guided in guide grooves extending laterally relative to the respective line bushings and perpendicular to said bottom part of said base body;
a cover part with contact surfaces for the respective lines located in the respective receiving spaces, said cover part being attachable to said base body by a screw connection, said support plates having edges facing said cover part and bordering said receiving spaces; and springs having spring forces producing pretensioning forces active between the respective receiving elements and the respective contact surfaces.

2. An attachment system according to claim 1 wherein each said receiving element is movably supported in said base body and is biased toward said cover part by the respective spring.

3. An attachment system according to claim 1 wherein said springs comprise compression springs located between said bottom part and said receiving elements to bias said receiving elements against said cover part.

4. An attachment system according to claim 1 wherein said guide grooves have depressions forming locking edges; and said guide strips have catch projections interacting with said locking edges to prevent said receiving elements from moving out of engagement with said base body.

5. An attachment system according to claim 4 wherein said base body comprises column bodies extending from said bottom part and laterally relative to said line bushings to said openings of said line bushings, said guide groove being on said column bodies.

6. An attachment system according to claim 5 wherein said column bodies have through bores; and said cover part has bores aligned with said through bores to form the screw connection.

7. An attachment system according to claim 1 wherein said cover part has an outer side opposite said contact surfaces;

mutually engageable alignment parts on said bottom part and said outer surface to form a tiered construction of multiple base parts and cover parts.

8. An attachment system according to claim 1 wherein said contact surfaces of said cover part comprise movable pressure bodies pretensioned by spring forces toward said receiving spaces of said receiving elements in said base body.

9. An attachment system according to claim 8 wherein said pressure bodies are movable in spring housings in guides within only a limited spring path and are pretensioned toward said receiving spaces by compression springs located in said spring housings.

10. An attachment system for lines, comprising: a base body securable to a support structure and having a bottom part;

a plurality of line bushings in said base body along a longitudinal axis and having openings for receiving lines, said bottom part extending underneath said line bushings;

at least one receiving element in each of said line bushings and forming a receiving space matched to a line or lines to be secured therein, said receiving elements forming support plates extending along said longitudinal axis, each said receiving element including guide strips on opposite sides of said support plate thereof and guided in guide grooves extending laterally relative to the respective line bushings and perpendicular to said bottom part of said base body, said guide grooves having depressions forming locking edges, said guide strips having catch projections interacting with said locking edges to prevent said receiving elements from moving out of engagement with said base body;

a cover part with contact surfaces for the respective lines located in the respective receiving spaces, said cover part being attachable to said base body by a screw connection, said support plates having edges facing said cover part and bordering said receiving spaces; and compression springs located between said bottom part and said receiving elements to bias said receiving elements against said cover part, each said receiving element being movably supported in said base body and being biased toward said cover part by the respective spring.

11. An attachment system according to claim 10 wherein said base body comprises column bodies extending from said bottom part and laterally relative to said line bushings to said openings of said line bushings, said guide groove being on said column bodies.

12. An attachment system according to claim 11 wherein said column bodies have through bores; and said cover part has bores aligned with said through bores to form the screw connection.

13. An attachment system for lines, comprising:

a base body securable to a support structure;

a plurality of line bushings in said base body along a longitudinal axis and having openings for receiving lines;

at least one receiving element in each of said line bushings and forming a receiving space matched to a line or lines to be secured therein, said receiving elements forming support plates extending along said longitudinal axis;

a cover part with contact surfaces for the respective lines located in the respective receiving spaces, said cover part being attachable to said base body by a screw connection, said support plates having edges facing said cover part and bordering said receiving spaces, said contact surfaces of said cover part having movable pressure bodies, said pressure bodies being movable in spring housings pretensioned toward said receiving spaces of said receiving elements by compression springs located in said spring housings, said spring housings having guideways with stop projections, said pressure bodies having guide strips extending therefrom, said guide strips having stop projections extending therefrom and guided in said guideways along a limited spring path, said stop projections on said guide strips and said stop projections of said guideways being engageable to prevent emergence of said pressure bodies from said spring housings; and springs having spring forces producing pretensioning forces active between the respective receiving elements and the respective contact surfaces.

* * * * *